US012651160B2

(12) United States Patent
Choi

(10) Patent No.: US 12,651,160 B2
(45) Date of Patent: Jun. 9, 2026

(54) METHOD FOR TRAINING NEURAL NETWORK BY USING DE-IDENTIFIED IMAGE AND SERVER PROVIDING SAME

(71) Applicant: KakaoBank Corp., Seongnam-si (KR)

(72) Inventor: Ho Yeol Choi, Seongnam-si (KR)

(73) Assignee: KakaoBank Corp., Seongnam-si (KR)

( * ) Notice: Subject to any disclaimer, the term of this patent is extended or adjusted under 35 U.S.C. 154(b) by 83 days.

(21) Appl. No.: 17/795,597

(22) PCT Filed: Jan. 26, 2021

(86) PCT No.: PCT/KR2021/001023
§ 371 (c)(1),
(2) Date: Jul. 27, 2022

(87) PCT Pub. No.: WO2021/153971
PCT Pub. Date: Aug. 5, 2021

(65) Prior Publication Data
US 2023/0076017 A1     Mar. 9, 2023

(30) Foreign Application Priority Data
Jan. 29, 2020    (KR) ........................ 10-2020-0010271

(51) Int. Cl.
$G06N\ 3/08$      (2023.01)
$G06V\ 10/74$      (2022.01)
(Continued)

(52) U.S. Cl.
CPC ............. $G06N\ 3/08$ (2013.01); $G06V\ 10/761$ (2022.01); $G06V\ 10/7715$ (2022.01); $G06V\ 10/82$ (2022.01)

(58) Field of Classification Search
CPC .. G06V 10/7715; G06V 10/761; G06V 10/82; G06N 3/08; G06N 3/0455
See application file for complete search history.

(56) References Cited

U.S. PATENT DOCUMENTS

| | | | |
|---|---|---|---|
| 10,284,432 B1 | 5/2019 | Kuo et al. | |
| 10,984,560 B1 * | 4/2021 | Appalaraju | ............ G06V 10/82 |

(Continued)

FOREIGN PATENT DOCUMENTS

| | | |
|---|---|---|
| KR | 10-2011-0070735 A | 6/2011 |
| KR | 10-1713089 B1 | 3/2017 |

(Continued)

OTHER PUBLICATIONS

Evaluating the Effectiveness of Automated Identity Masking (AIM) Methods with Human Perception and a Deep Convolutional Neural Network (CNN) Hooge, 2019, arXiv (Year: 2019).*

(Continued)

*Primary Examiner* — Michael J Huntley
*Assistant Examiner* — Vincent Anton Spraul
(74) *Attorney, Agent, or Firm* — WHDA, LLP

(57) ABSTRACT

The present invention relates to a neural network training method. The neural network training method using a de-identified image according to the present invention comprises the steps of: encoding a first image represented by a n-th dimensional vector into a predetermined p-th dimensional second image; decoding the second image into a q-th dimensional third image; inputting the third image to a neural network and extracting object information included in the third image; and training at least one parameter information used for computation in the neural network by using the extracted object information. According to the present invention, de-identified images are used for neural network training such that neural network training is made possible without using personal information included in images.

9 Claims, 7 Drawing Sheets

(51) Int. Cl.
    *G06V 10/77*      (2022.01)
    *G06V 10/82*      (2022.01)

(56) References Cited

U.S. PATENT DOCUMENTS

| | | | |
|---|---|---|---|
| 2010/0074322 A1* | 3/2010 | Terashima | H04N 19/172 |
| | | | 375/E7.076 |
| 2018/0052971 A1* | 2/2018 | Hanina | A61B 5/7267 |
| 2018/0129900 A1 | 5/2018 | Kiraly et al. | |
| 2018/0247193 A1* | 8/2018 | Holtham | H04N 19/60 |
| 2018/0374105 A1 | 12/2018 | Azout et al. | |
| 2019/0138748 A1* | 5/2019 | Long | H04N 7/183 |
| 2019/0273948 A1* | 9/2019 | Yin | G06N 3/045 |
| 2020/0034520 A1* | 1/2020 | Kim | G06F 21/6254 |
| 2020/0167966 A1* | 5/2020 | Kim | G06F 18/2193 |
| 2020/0177470 A1* | 6/2020 | Kuo | H04L 65/75 |
| 2020/0372180 A1* | 11/2020 | Venkataraman | H04L 63/0407 |

FOREIGN PATENT DOCUMENTS

| | | | |
|---|---|---|---|
| KR | 10-1793510 B1 | 11/2017 | |
| KR | 10-1861520 B1 | 5/2018 | |
| WO | 2018/017467 A1 | 1/2018 | |

OTHER PUBLICATIONS

Al-Allaf, "Improving the Performance of Backpropagation Neural Network Algorithm for Image Compression/Decompression System," 2010, Journal of Computer Science 6 (11): 1347-1354 (Year: 2010).*

Akyazi et al., "Learning-Based Image Compression using Convolutional Autoencoder and Wavelet Decomposition," 2019, Proceedings of the IEEE/CVF Conference on Computer Vision and Pattern Recognition (CVPR) Workshops (Year: 2019).*

Baluja et al., "Task-specific color spaces and compression for machine-based object recognition", 2019, Technical Disclosure Commons, https://www.tdcommons.org/dpubs_series/2067 (Year: 2019).*

Dimililer, "Backpropagation Neural Network Implementation for Medical Image Compression," 2013, http://dx.doi.org/10.1155/2013/453098 (Year: 2013).*

Li et al., "DeepObfuscator: Adversarial Training Framework for Privacy-Preserving Image Classification," 2019, arXiv:1909.04126v1 (Year: 2019).*

International Search Report dated Apr. 19, 2021, issued in counterpart International Application No. PCT/KR2021/001023 (3 pages).

Notice of Preliminary Examination Results dated May 4, 2020, issued in counterpart KR Patent Application No. 10-2020-0010271, w/English translation (8 pages).

Written Decision on Registration dated Jun. 16, 2020, issued in counterpart KR Patent Application No. 10-2020-0010271, w/English translation (4 pages).

Office Action dated Mar. 8, 2024, issued in counterpart Singapore Patent Application No. 11202251590R (7 pages).

* cited by examiner

(h, w,...)
n-th dimensions

Encoder (h', w',...)
p-th dimensions

21

114

22

(h, w,...)
p-th dimensions

Decoder (h', w',...)
q-th dimensions

FIG. 7

METHOD FOR TRAINING NEURAL NETWORK BY USING DE-IDENTIFIED IMAGE AND SERVER PROVIDING SAME

TECHNICAL FIELD

The disclosure relates to a neural network training method, and more particularly, to a neural network training method using a de-identified image.

BACKGROUND ART

As big data-based analysis technology is applied to various industrial fields, it is necessary to separately protect and manage personal information including information on an individual among collected data.

Simultaneously, artificial intelligence technology is also replacing conventional data analysis technology to expand the scope of its application. For example, in more cases, the artificial intelligence uses biometric information such as a fingerprint, a face or the like to verify the identity of a user as a method for user authentication and provides a personalized service based thereon.

Here, for the user authentication using personal biometric information, a neural network used for the artificial intelligence may need to learn various biometric information, and training data itself used for this training may include the personal information as the biometric information. It is thus necessary to be cautious about the usage and management of the personal information.

Accordingly, it is necessary to secure a basis of the usage in order to perform the training by using big data including the personal information in the field of artificial intelligence and provide the service based thereon. Recently prepared is a law to de-identify such personal information, exclude de-identified information from personal credit information protection, and the like.

In a financial industry, there are increasing needs for protecting a user's facial image, an identity card image or the like, which is inevitably required, in order to open an account and provide a financial service in a non-face-to-face manner by launching an internet bank or the like and for de-identifying the personal information in order for the artificial intelligence to perform the training.

However, the current training method used for the artificial intelligence may be about data in a general format, and does not consider the protection and de-identification of the personal information.

It is necessary to secure a lot of training data for the training of the neural network used for the artificial intelligence, and a more efficient method of de-identifying the training data and a training method based thereon are required in order to provide an efficient service based on the artificial intelligence.

DISCLOSURE

Technical Problem

An object of the disclosure is to provide a neural network training method using a de-identified image.

Another object of the disclosure is to provide a method to de-identify an image by considering prediction accuracy of a neural network.

Technical Solution

In one general aspect, a neural network training method using a de-identified image includes: encoding a first image represented by an n-th dimensional vector into a predetermined p-th dimensional second image; decoding the second image into a q-th dimensional third image; inputting the third image to the neural network and extracting object information included in the third image; and training at least one parameter information used for a computation in the neural network by using the extracted object information.

The training may include training the parameter information used for the encoding or decoding computation based on the extracted object information.

The training may include training the parameter information by using a correlation between a degree of de-identification defining similarity between the third image and the first image and prediction accuracy of the neural network for the object information.

A size of p-th dimensions may be determined based on the degree of the de-identification.

N-th dimensions and q-th dimensions may have the same size.

The method may further include storing the second image encoded in the determined p-th dimensions, wherein the decoding may include decoding the stored second image into the third image when the neural network performs the training.

The decoding may include decoding the second image to have a data value different from that of the first image when decoding the second image in the q-th dimensions.

In another general aspect, a neural network training server using a de-identified image includes: a de-identification unit encoding a first image represented by an n-th dimensional vector into a predetermined p-th dimensional second image, and then decoding the second image into a q-th dimensional third image; and a training unit inputting the third image to the neural network and extracting an object information included in the third image to train at least one parameter information used for a computation in the neural network.

The training unit may train the parameter information used for the encoding or decoding computation based on the extracted object information.

The training unit may train the parameter information by using a correlation between a degree of de-identification defining similarity between the third image and the first image and prediction accuracy of the neural network for the object information.

The server may further include a database storing the second image encoded in determined p-th dimensions, wherein the de-identification unit decodes the stored second image into the third image when the neural network performs the training.

The de-identification unit may decode the second image to have a data value different from that of the first image when decoding the second image in the q-th dimensions.

Advantageous Effects

According to the disclosure, it is possible for the neural network to perform the training without using the personal information included in the image because the de-identified image is used for the training of the neural network.

According to the disclosure, it is also possible to manage more efficiently the training data because the image is de-identified and stored for the de-identified image not to be restored to the original image.

According to the disclosure, it is also possible to process the image more efficiently by adjusting the dimension of the information included in the image based on the prediction performance of the neural network and encoding the same.

DESCRIPTION OF DRAWINGS

FIG. 2 is an exemplary diagram showing object information detection in a neural network training method performed by a service operation server according to an embodiment of the disclosure.

FIG. 7 is an exemplary diagram showing the neural network training method performed by the service operation server according to an embodiment of the disclosure.

BEST MODE

The following description illustrates only a principle of the disclosure. Therefore, those skilled in the art may implement the principle of the disclosure and invent various devices included in the spirit and scope of the disclosure although not clearly described or shown in the specification. In addition, it is to be understood that all conditional terms and embodiments mentioned in the specification are obviously intended only to allow those skilled in the art to understand a concept of the disclosure in principle, and the disclosure is not limited to the embodiments and states particularly mentioned as such.

The above-mentioned objects, features and advantages will become more obvious from the following detailed description provided in relation to the accompanying drawings. Therefore, those skilled in the art to which the disclosure pertains may easily practice a technical idea of the disclosure.

Further, in describing the disclosure, in the case in which it is judged that a detailed description of a well-known technology associated with the disclosure may unnecessarily make the gist of the disclosure unclear, it will be omitted. Hereinafter, the embodiments of the disclosure will be described in detail with reference to the accompanying drawings.

Figure 1:
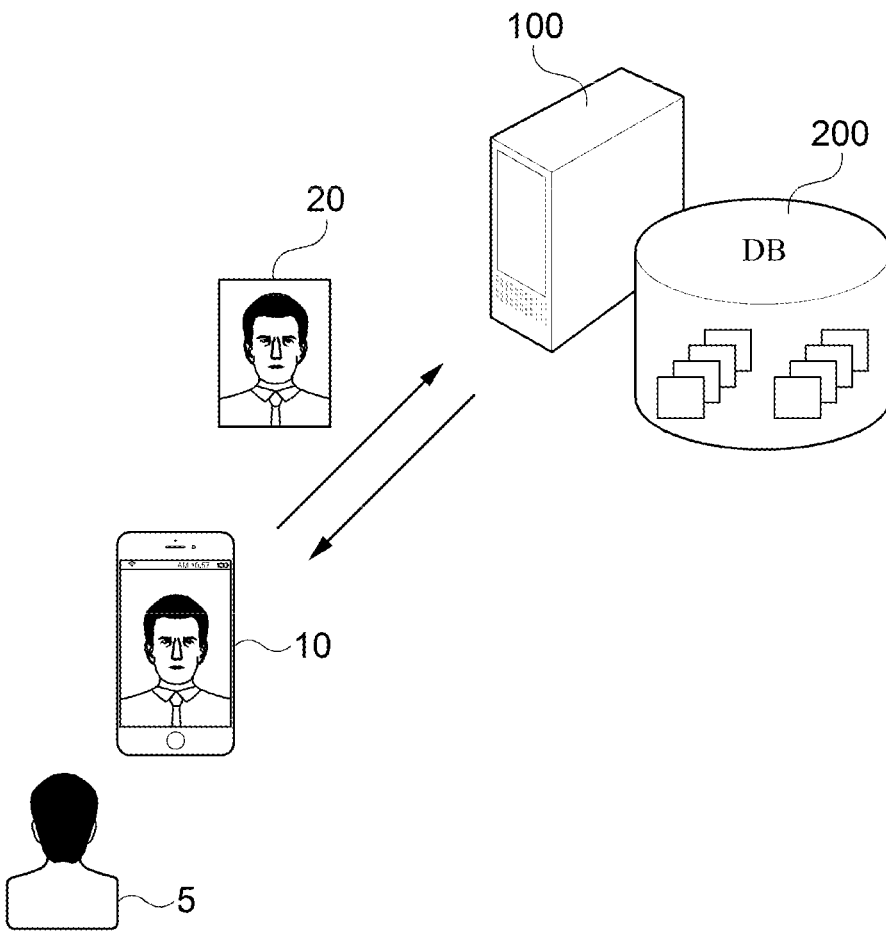
FIG. 1 is an exemplary diagram showing a system providing a service based on de-identified image recognition according to an embodiment of the disclosure.

FIG. 1 is an exemplary diagram showing a system providing a service based on de-identified image recognition according to an embodiment of the disclosure.

Referring to FIG. 1, a user 5 may capture the user's own face by using a user terminal 10.

A service operation server 100 may receive a captured face image 20 from the user 5, compare an identity image with the captured facial image 20, perform user authentication, and provide a service based thereon.

Here, the service operation server 100 may perform the user authentication by using a neural network and perform a faster and more accurate user verification procedure than a conventional image processing method by using the neural network.

Iterative training may be required in order to the neural network used for the user authentication to determine the identity of the user through the image, and the service operation server 100 may thus store various training data in a separate database 200.

However, as described above, the neural network used for the user authentication may be required to training images including facial information of the user 5 as the training data and may thus be required to directly use personal information.

Therefore, in this embodiment, the service operation server 100 may protect the personal information by de-identifying image including the personal information such as the facial information used as the training data and making it impossible to restore the de-identified image to an original image.

The service operation server 100 according to this embodiment may de-identify the image received from the user terminal 10 and store the de-identified image as the training data in the database 200 to be used for the training of the neural network.

In general, the neural network used for detecting the image may use data values in the images represented as multi-dimensional vectors in a color space.

The data values in the image may be defined as a height, a width and a depth, which define its size as a three-dimensional vector. Here, the depth may be defined as a size of a channel, which is a method of representing information on each pixel.

For example, the depth of the image may be represented as a red-green-blue (RGB) code as information that defines its color. When the image is represented by the RGB code, a size of the channel may be three (3) and each channel may store a RGB value of the corresponding pixel.

Alternatively, it is possible to represent information in the image as the multi-dimensional vector by allowing the channel to include grayscale or hue, saturation and value (HSV).

In addition, the plurality of images may be used for the training of the neural network, and the training data may also include a four-dimensional vector by adding the number of these images.

The neural network may apply a filter defined for each channel to the data values in the image represented by the multi-dimensional vector to perform a convolutional computation and extract feature information in the image.

The convolutional computation may be sequentially performed in units of layers included in the neural network, and the neural network may include a network in which convolutional layers are stacked.

For example, when an object is defined by a distribution or pattern of a specific color, the neural network may be trained by adjusting a weight of a filter that emphasizes the specific color.

In detail, in this embodiment, the neural network may be trained to extract object information 30 from the facial image including the facial information of the user 5 for the user verification. Here, the object information 30 may be the feature information having the highest importance for distinguishing a large number of data, and may be, for example, unique information having the highest identification power in the facial information. For example, the neural network may extract eyes, nose, mouth and the like, included in the facial information, from the image, and may be trained to extract, as the object information 30, information determined to be necessary to identify whose facial image these extracted images belong to, such as their shapes, relative positional relationship and the like.

The object information 30 may include one or more feature information, and a weight may be given to each feature information based importance required for the identification.

However, the facial image here may include the personal information as it is, and the training data itself used for the training may be the personal information. In addition, the neural network may use an actual image as the training data to have a robust performance on images under various capturing conditions, and the actual image may include more diverse personal information.

Therefore, an additional processing process for separately protecting the personal information may be required for using the facial image for the training of the neural network, and the training method according to the disclosure may de-identify the image including the personal information and train the neural network.

Hereinafter, the training method of the service operation server 100 according to this embodiment is described in more detail.

Figure 2:
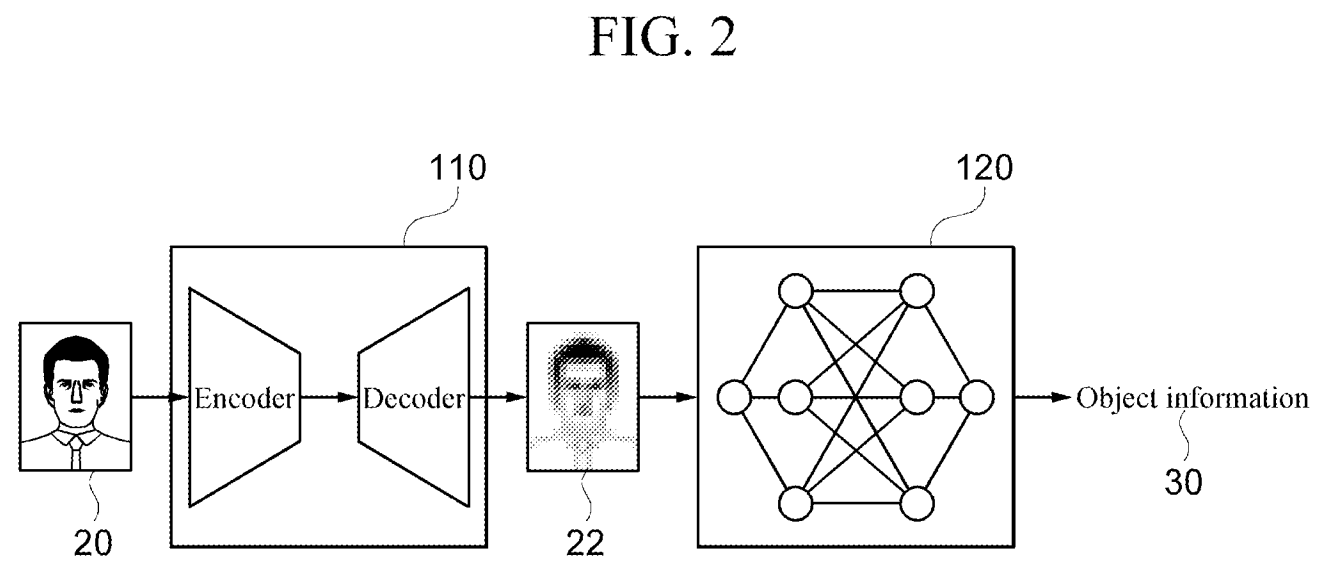

Referring to FIG. 2, the service operation server 100 according to this embodiment may include a de-identification unit 110 and a training unit 120.

The de-identification unit 110 may de-identify the face image captured by and transmitted from the user terminal 10.

In detail, the de-identification unit 110 may include an encoder 112 and a decoder 114.

The de-identification unit 110 may encode the received face image by using the encoder 112 and convert the image through decoding again to generate training data.

Here, the image converted by the decoder 114 may include information represented in a format different from that of the original face image.

In detail, the converted image may be converted for the identity of the object included in the image not to be recognized with naked eyes and may have a format which is impossible to be restored to the original face image.

The converted image may be used as input data of a neural network model and may thus be information making it impossible to recognize the identity with the naked eyes and represented in a more efficient format for the neural network model to extract the object information 30.

The training unit 120 may train the neural network which extracts the object information 30 by using the de-identified image received from the de-identification unit 110.

When the de-identified image is input to the neural network, the neural network may output the object information 30. The training unit 120 may train and update weights of various parameters used for extracting the feature information in the neural network by using the output object information 30.

In addition, the training unit 120 may also train various parameters of the encoder 112 or decoder 114, used to de-identify the image together with the neural network.

Figure 3:
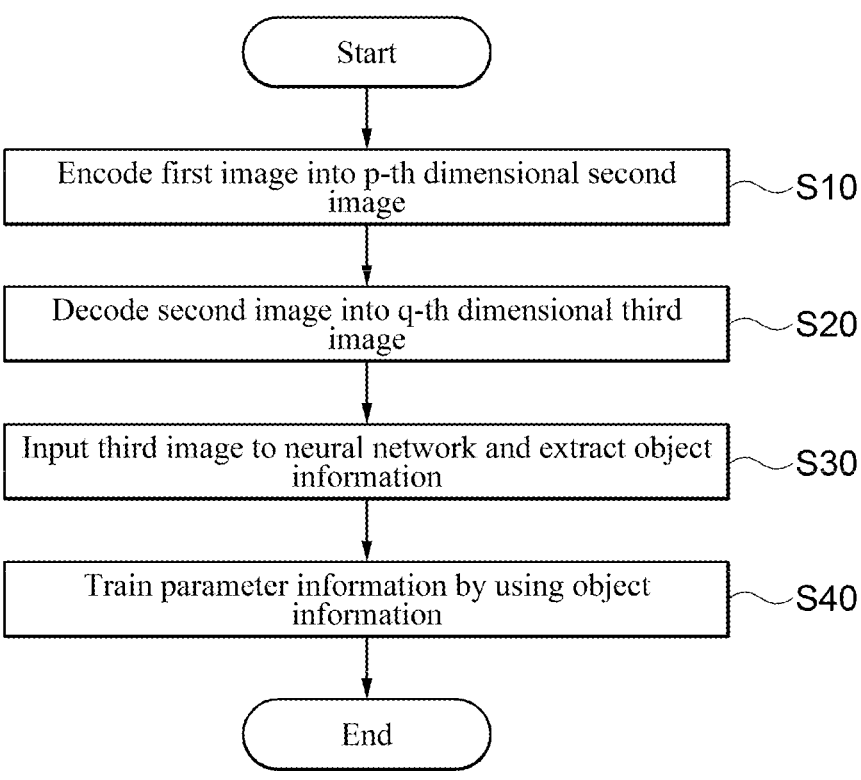
FIG. 3 is a flowchart showing a training process of the service operation server according to an embodiment of the disclosure.

Hereinafter, the training method is sequentially described in more detail with reference to FIG. 3.

First, the first image 20 represented by an n-th dimensional vector may be encoded into a predetermined p-th dimensional second image 21 (S10).

N-th dimensions may define the number of features representing information included in the first image 20 captured by the user terminal 10 and transmitted to the service operation server 100. For example, the n-th dimensions may be a size of the image and defined as three dimensions of height, width and depth of the image.

That is, the n-th dimensional first image 20 may be compressed using the encoder 112 and converted into the p-th dimensional second image 21.

Figure 4:
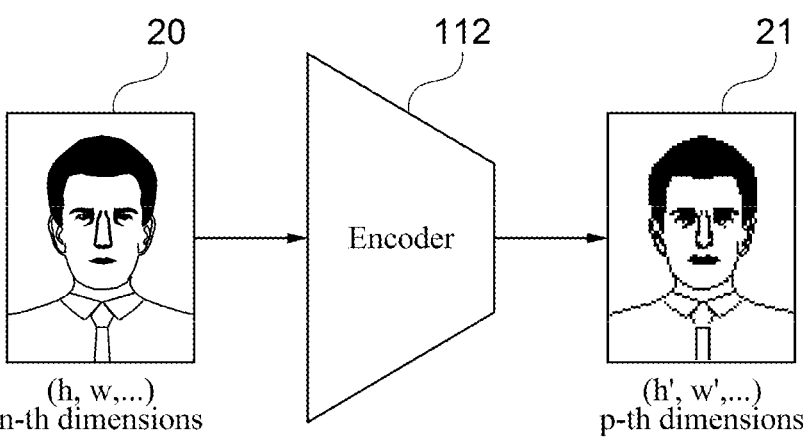
FIG. 4 is an exemplary diagram showing an image encoding method of the service operation server according to an embodiment of the disclosure.

Referring to FIG. 4, the received first image 20 may be input to the encoder 112, and the encoder 112 may generate the p-th dimensional second image 21 according to a predetermined compression rule.

The second image 21 may be encoded into the p-th dimensions, which are reduced dimensions different from dimensions representing the first image 20.

For example, data values of the n-th dimensions representing the first image 20 may be compressed according to an encoding standard, and the second image 21 may thus be represented in the p-th dimensions having a reduced data size compared to the n-th dimensions.

Alternatively, it is possible to reduce the number of dimensions by projecting the data values based on a specific dimension among the n-th dimensions, and to generate the reduced p-th dimensional second image 21.

As described above, the encoder 112 may encode the first image 20 in the p-th dimensions in which the number of dimensions itself is reduced compared to the n-th dimensions or the data size representing the data value of each dimension is reduced.

Next, the p-th dimensional second image 21 generated by the encoder 112 may be decoded into a q-th dimensional third image 22 (S20).

Q-th dimensions may re-expand the p-th dimensions through the decoder 114 and redefine the data values in the input second image 21.

Figure 5:
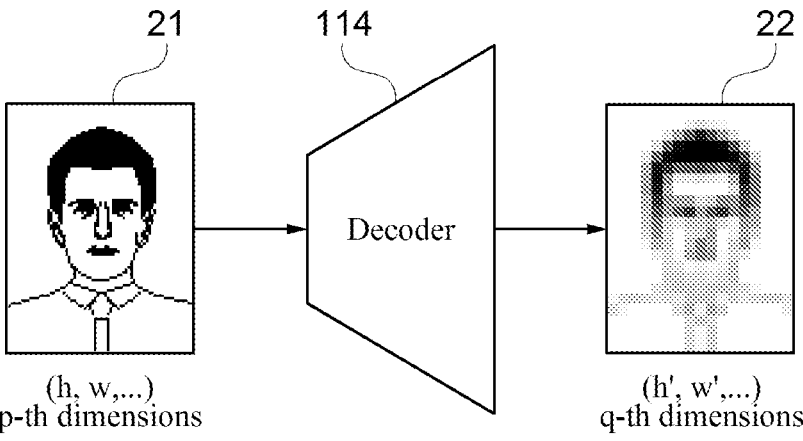
FIG. 5 is an exemplary diagram showing an image decoding method of the service operation server according to an embodiment of the disclosure.

Referring to FIG. 5, the decoder 114 may expand the data values of the second image 21 defined in the p-th dimensions back to data values in the q-th dimensions. In detail, the decoder 114 may expand the data values of the second image 21 into q-th dimensional information by using weight parameters.

Here, the q-th dimensions decoded in this embodiment may be defined as the same dimensions as the n-th dimensions of the first image 20 before being encoded. However, the third image 22 decoded in the q-th dimensions may be generated from the encoded second image 21 and may have different data values from the original first image 20 on the same dimensions.

That is, the first image 20 may be an image captured in a general way and it is thus possible to identify the object included therein with the naked eyes. However, the third image 22 may include information redefined after being encoded, and include data values in a form in which the object is impossible to be identified with the naked eyes.

Through the above process, the training method according to this embodiment may generate the second image 21 and the third image 22 by de-identifying the first image 20.

Next, the de-identified third image 22 may be input to the neural network, and the object information 30 included in the third image 22 may be extracted (S30).

In addition, the neural network may be trained using the extracted object information 30 (S40).

The neural network may update parameters in the network to have a more robust performance on the de-identified images, which are the input data.

Figure 6:
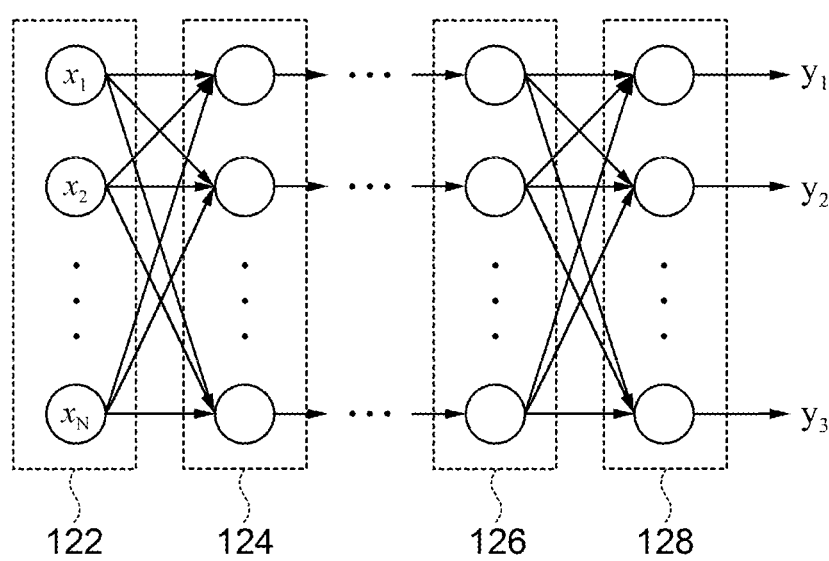
FIG. 6 is an exemplary diagram showing a configuration of the neural network of the service operation server according to an embodiment of the disclosure.

Referring to FIG. 6, the neural network may include a plurality of hidden layers 124 and 126, which perform the convolutional computation in an input layer 122 and an output layer 128. The hidden layers 124 and 126 may be nodes performing the weight computation in response to the input data.

In this embodiment, the neural network may include the convolutional layers performing the convolutional computation, and the nodes in the hidden layers 124 and 126 may be filters performing the convolutional computation on the data values in the de-identified image for each unit region.

That is, the data values for each channel in the input image may be sequentially computed while passing through the plurality of convolutional layers, the characteristic distribution or pattern of the data values emphasized may be found through this computation, and the object information 30 in the image may be extracted.

The object information 30 extracted as an output signal for the training may be compared with a target value of the actual image to calculate an error, and the calculated error may be propagated in the neural network in a reverse direction according to a backpropagation algorithm. For example, the neural network may be trained to find a cause of the error by using the backpropagation algorithm and change a connection weight between the nodes of the neural network.

Figure 7:
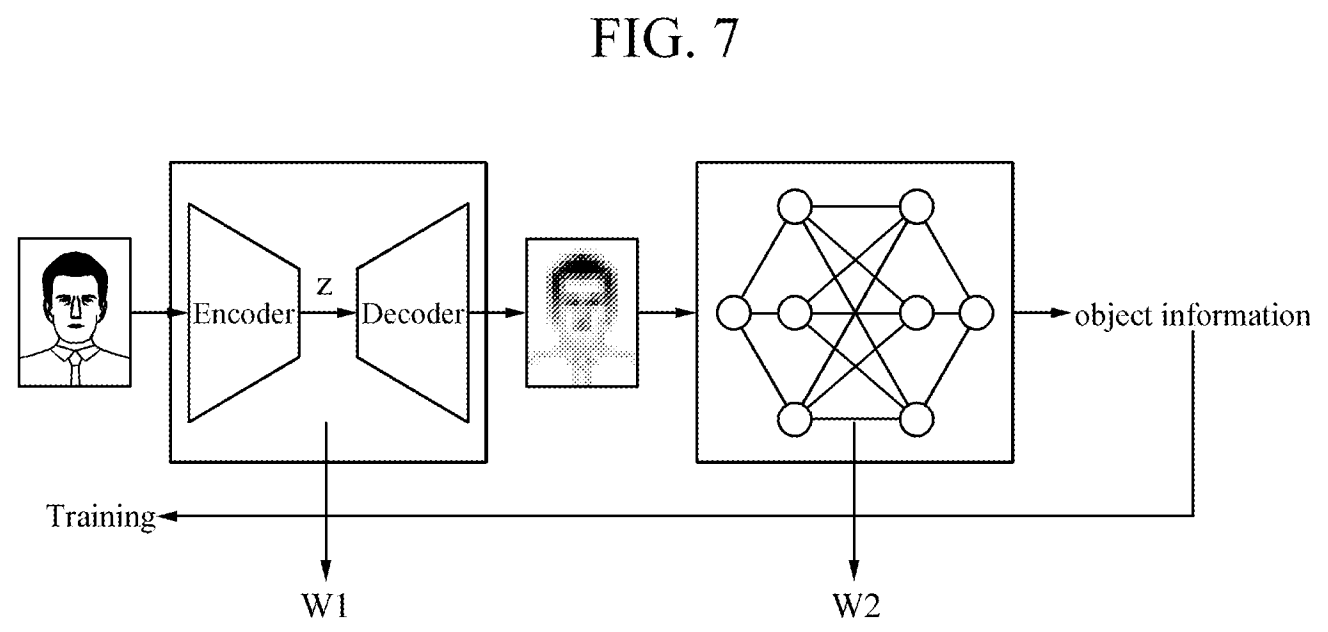

In addition, referring to FIG. 7, the training method according to this embodiment may be performed by training a weight parameter W2 between each node performing the convolutional computation in the neural network, together with a de-identification parameter W1 used for the encoding or the decoding.

That is, it is possible to update the parameter W2 defining the connection weight between the nodes in the layer according to the backpropagation algorithm by using the extracted object information 30, and also possible to update the parameter W1 used for computing the encoding or the decoding of the de-identification unit 110.

For example, it is possible to determine encoding parameters for reducing the n-th dimensional first image 20 to the p-th dimension "z" through the training when a size of the p-th dimensions "z" is determined in consideration of a compression rate as a de-identification degree of the de-identification unit 110.

For example, the training may be performed to update the parameters used for the computation as the size and sampling rate of a unit block that becomes a data sampling standard when the dimensions of the encoder 112 are reduced.

Conversely, the training may also be performed to update the relevant weight parameters when the dimensions used for the decoding are expanded.

Through the above process, the training method according to this embodiment may update the parameters in the neural network by using the extracted object information 30 and simultaneously update the parameters of the encoder 112 and decoder 114, which perform the de-identification.

In addition, the degree of the de-identification may be determined based on the compression rate of the encoder 112, and it may thus be advantageous to protect the personal information included in the image when the degree of the de-identification is increased. However, prediction accuracy of the neural network by using the decoded third image 22 may be lower.

Therefore, the training unit 120 may also relatively adjust the parameters used for the de-identification in consideration of the degree of the de-identification and the prediction accuracy. For example, the training unit 120 may update the encoding or decoding parameters to weaken information necessary to recognize the identity with the naked eyes and to strengthen information advantageous for extracting the feature information of the neural network.

The training unit may further train the parameter information by using a correlation between the degree of the de-identification defining similarity between the third image 22 and the first image 20 and the prediction accuracy of the neural network for the object information 30.

As described above, the training method according to this embodiment may train the encoder 112, the decoder 114 and the neural network together, change the image to specify a portion that may be recognized well by a machine, not a human, and simultaneously allow the neural network to easily adapt thereto.

That is, the neural network may be trained to emphasize a portion necessary to mechanically extract the object from the image and weaken the rest.

Figure 8:
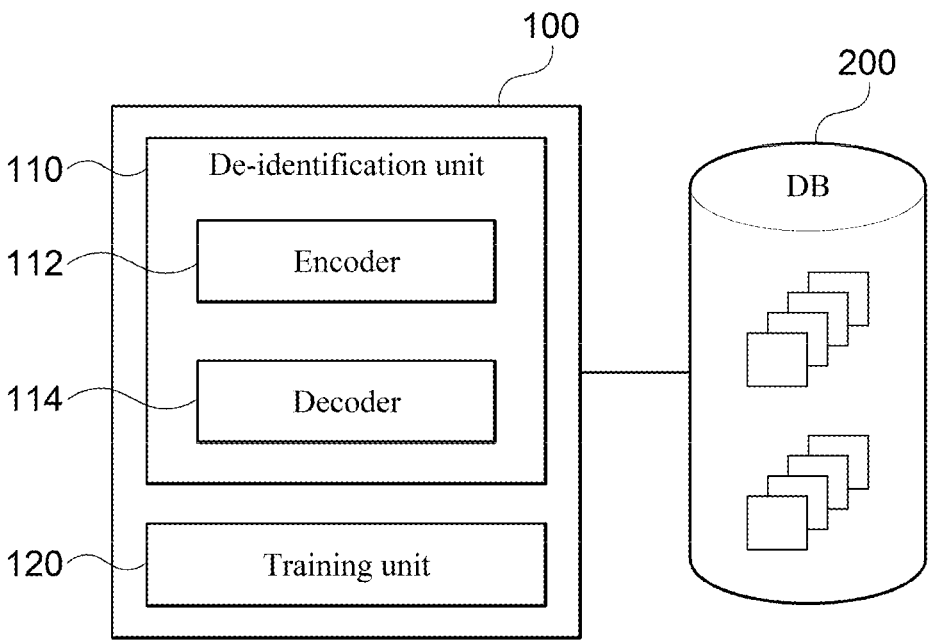
FIG. 8 is a block diagram showing a configuration of the service operation server according to another embodiment of the disclosure.

Hereinafter, the configuration of the service operation server 100 according to this embodiment is described with reference to FIG. 8.

In this embodiment, the service operation server 100 may include the de-identification unit 110 and the training unit 120.

The de-identification unit 110 may include the encoder 112 and the decoder 114.

The encoder 112 may compress the n-th dimensional first image 20 captured by the user terminal 10 and generate the compressed p-th dimensional second image 21.

The encoder 112 may compress the data values of the n-th dimensions in the first image 20 according to the encoding standard, and thus may generate the p-th dimensional second image 21 having the reduced dimensions compared to the n-th dimensions.

The decoder 114 may change the second image 21 having the compressed information compared to the first image 20 to the q-th dimensional third image 22.

Here, the q-th dimensions may be defined as the same dimensions as the n-th dimensions of the first image 20.

However, the third image 22 changed to the q-th dimensions may be decoded from the second image 21 and may have different data values from the original first image 20.

Ultimately, the third image 22 may include the information redefined after being encoded, and may include the data values in the form in which the object is impossible to be identified with the naked eyes.

That is, the de-identification unit 110 may use the encoder 112 and the decoder 114 to use the second image 21 as an intermediate image and finally generate the third image 22 as the training data.

The training unit 120 may use the third image 22 as the input data and extract the object information 30 by using the neural network.

The neural network may include the plurality of layers sequentially performing the convolutional computation on the input data, and each layer may include the plurality of nodes including the data for the convolutional computation.

In this embodiment, the neural network may perform the convolutional computation on the data values in the q-th dimensions of the third image 22. That is, the node in the convolution layer may perform the convolutional computation on the data values through the filter.

Here, each node may define the weight when transmitting the data value as the parameter, and in this embodiment, the training may be performed to update the weight by using the object information 30 output to the neural network.

In addition, the training unit 120 may also train the parameters of the de-identification unit 110 in addition to the neural network.

The de-identification unit 110 may encode the first image 20 as the second image 21 and encode the same back into the q-th dimensions, and the number of the p-th dimensions defining the dimensions of the second image 21 may thus be determined through the training.

In addition, other parameters used in the encoder 112 and the decoder 114 may also be updated through the training.

As described above, the training unit 120 may train the neural network to output an optimal result for the de-identified image in consideration of both the degree of the de-identification and the degree of the prediction of the neural network.

Furthermore, the service operation server 100 may include a separate database 200 storing the de-identified image.

The iterative training may be required to be performed through a large amount of the training data for the training of the neural network, and it is thus also possible to store the de-identified image in the database 200 and train the neural network through the same.

That is, the service operation server 100 may de-identify the received first images 20 and then delete the same, and store only the de-identified second image 21 or third image 22 in the database 200 to prevent damage caused by leakage of the personal information.

In addition, when the second image 21 is stored in the database 200, it is possible to further increase efficiency in the training of the neural network by accumulating a determined amount of the second images 21, and bulk-decoding the accumulated second images 21 to generate the third image 22.

According to the disclosure above, it is possible for the neural network to perform the training without directly using the personal information included in the image because the de-identified image is used for the training of the network. In addition, according to the disclosure, it is possible to increase efficiency in protecting the personal information and managing the data by de-identifying the image and storing the same for the image not to be restored to the original image.

In addition, according to the disclosure, it is possible to increase efficiency in processing the image by adjusting the dimensions of the information included in the image based on the prediction performance of the neural network and encoding the same.

Meanwhile, in the disclosure and the claims, terms such as "first", "second", "third", "fourth" and the like, if any, will be used to distinguish similar components from each other and used to describe a specific sequence or a generation sequence, and is not necessarily limited thereto. It will be understood that these terms are compatible with each other under an appropriate environment so that the exemplary embodiments of the disclosure set forth herein may be operated in a sequence different from a sequence illustrated or described herein. Likewise, in the case in which it is described herein that a method includes a series of steps, a sequence of these steps suggested herein is not necessarily a sequence in which these steps may be executed. That is, any described step may be omitted and/or any other step that is not described herein may be added to the method.

As described above, the various embodiments described herein may be implemented in a computer-readable recording medium by using, for example, software, hardware or a combination thereof.

According to a hardware implementation, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors or electric units for performing other functions. In some cases, the embodiments described in the disclosure may be implemented by the processor itself.

According to a software implementation, the embodiments such as procedures and functions described in the specification may be implemented by separate software modules. Each of the software modules may perform one or more functions and operations described in the specification. A software code may be implemented as a software application written in a suitable programming language. The software code may be stored in a memory module and executed by a control module.

The spirit of the disclosure has been illustratively described hereinabove. It will be appreciated by those skilled in the art to which the disclosure pertains those various modifications, alterations and substitutions may be made without departing from the essential features of the disclosure.

Accordingly, the embodiments and the accompanying drawings disclosed in the disclosure are provided not to limit the spirit of the disclosure, but to fully describe the disclosure, and the scope of the disclosure is not limited by the embodiments or the accompanying drawings. The scope of the disclosure should be interpreted by the following claims, and all the spirit equivalent to the following claims should be interpreted to fall within the scope of the disclosure.

The invention claimed is:

1. An iterative neural network training method using a de-identified image, performed by a neural network training server, the method comprising, during each iteration of the iterative neural network training method:

encoding a first image represented by a vector of n-th dimensions into a second image of predetermined pth-dimensions;

decoding the second image into a third image of q-th dimensions, wherein the third image corresponds to the de-identified image of the first image;

inputting the third image to the neural network and extracting object information included in the third image; and training at least one parameter information of the neural network and de-identification parameter information by using an error of the extracted object information compared with a ground truth label associated with the first image, and a backpropagated error obtained by first updating the at least one parameter information of the neural network, and then continuing to backpropagate the error of the extracted object information through the decoder and the encoder, wherein the error of the extracted object information updates the at least one parameter information in the neural network, and the backpropagated error updates the de-identification parameter information to determine a compression rate of the encoding computation, and wherein, during service operation, the first image is deleted, and only the second image and the ground truth label associated with the first image are stored in a database, and a plurality of the stored second images accumulated over a plurality of service operations are bulk-decoded in a batch to generate the third image for further training parameter information of the neural network using the third image.

2. The method of claim 1, wherein a size of the p-th dimensions is determined based on the compression rate of the encoding computation, and wherein the compression rate of the encoding computation is associated with a degree of a de-identification of the de-identified image.

3. The method of claim 2, wherein the n-th dimensions and the q-th dimensions have the same size.

4. The method of claim 1, further comprising storing the second image encoded in the predetermined p-th dimensions, wherein the decoding comprises decoding the stored second image into the third image when the neural network performs the training.

5. The method of claim 1, wherein the decoding comprises decoding the second image to have a data value different from that of the first image when decoding the second image in the q-th dimensions.

6. One or more computers and a program stored in a non-transitory computer-readable recording medium to allow the one or more computers to perform operations of each method of claim 1 when executed by the one or more computers.

7. An iterative neural network training server using a de-identified image, the server comprising during each iteration of the iterative neural network training method:

a de-identification unit configured to encode a first image represented by a vector of n-th dimensions into a second image of predetermined p-th dimensions, and then decode the second image into a third image of q-th dimensions, wherein the third image corresponds to the de-identified image of the first image; and a training unit configured to input the third image to the neural network and extract an object information included in the third image to train at least one parameter information of the neural network and de-identification parameter information by using an error of the extracted object information compared with a ground truth label associated with the first image, and a backpropagated error obtained by first updating the at least one parameter information of the neural network, and then continuing to backpropagate the error of the extracted object information through the decoder and the encoder, wherein the error of the extracted object information updates the at least one parameter information in the neural network, and the backpropagated error updates the de-identification parameter information to determine a compression rate of the encoding computation, and wherein, during service operation, the first image is deleted, and only the second image and the ground truth label associated with the first image are stored in a database, and a plurality of the stored second images accumulated over a plurality of service operations are bulk-decoded in a batch to generate the third image for further training of the neural network using the third image.

8. The server of claim 7, further comprising a database storing the second image encoded in predetermined p-th dimensions, wherein the de-identification unit is configured to decode the stored second image into the third image when the neural network performs the training.

9. The server of claim 7, wherein the de-identification unit is configured to decode the second image to have a data value different from that of the first image when decoding the second image in the q-th dimensions.

* * * * *